(12) United States Patent
Mauda et al.

(10) Patent No.: US 9,314,718 B2
(45) Date of Patent: Apr. 19, 2016

(54) BACKWASH ARRANGEMENT FOR CLEANING A CYLINDRICAL FILTER SCREEN

(71) Applicant: Yamit Filtration & Water Treatment ltd, Moshav Shaar Efraim (IL)

(72) Inventors: Arie Mauda, Moshav Olesh (IL); Oded Elish, Kiriat-Tivon (IL); Rey Zeeman, Shavey Shomron (IL)

(73) Assignee: YAMIT FILTRATION & WATER TREATMENT LTD, Moshav Shaar Efraim (IL)

( * ) Notice: Subject to any disclaimer, the term of this patent is extended or adjusted under 35 U.S.C. 154(b) by 109 days.

(21) Appl. No.: 14/076,220

(22) Filed: Nov. 10, 2013

(65) Prior Publication Data

US 2015/0129483 A1   May 14, 2015

(51) Int. Cl.
*B01D 29/68* (2006.01)
*B01D 29/23* (2006.01)
*B01D 29/52* (2006.01)

(52) U.S. Cl.
CPC ............ *B01D 29/68* (2013.01); *B01D 29/23* (2013.01); *B01D 29/52* (2013.01); *B01D 29/682* (2013.01)

(58) Field of Classification Search
CPC .... B01D 33/06; B01D 33/00; B01D 33/0009; B01D 33/0006; B01D 33/0003; B01D 33/0074; B01D 33/007; B01D 33/0064; B01D 33/0061; B01D 33/503; B01D 33/50; B01D 33/48; B01D 33/44; B01D 33/463; B01D 33/46; B01D 33/466; B01D 33/506; B01D 29/68–29/688; B01D 29/6438–29/6461; B01D 29/0081; B01D 29/0079; B01D 29/0075; B01D 29/0002; B01D 29/0077; B01D 29/64; B01D 29/6446; B01D 29/682; B01D 29/686; B01D 35/16; B01D 25/38; B01D 25/386; Y10S 239/00–239/90
USPC ............ 210/411, 409, 407, 348; 134/24, 180
See application file for complete search history.

(56) References Cited

U.S. PATENT DOCUMENTS

| 4,643,828 A * | 2/1987 | Barzuza ........................ 210/412 |
| 6,186,340 B1 * | 2/2001 | Hirs .............................. 210/411 |
| 2008/0047885 A1 | 2/2008 | Shiekelmacher | |

FOREIGN PATENT DOCUMENTS

| DE | 19944107 | 4/2001 |
| GB | 1485989 | 9/1977 |
| WO | 2011058556 | 5/2011 |

* cited by examiner

*Primary Examiner* — David C Mellon
*Assistant Examiner* — Liam Royce
(74) *Attorney, Agent, or Firm* — Mark M. Friedman

(57) ABSTRACT

A backwash arrangement for cleaning a cylindrical filter screen includes a cylindrical filter screen within which extends an axial central conduit. A number of radial branch conduits extend outwards from the central conduit towards the cylindrical filter screen, each provided with a spring-loaded nozzle arrangement. The spring-loaded nozzle arrangement is biased into contact with the cylindrical filter screen, and includes a nozzle opening for passing across the cylindrical filter screen, and a pair of wheels deployed on opposing sides of the nozzle opening for rolling engagement with the cylindrical filter screen.

9 Claims, 5 Drawing Sheets

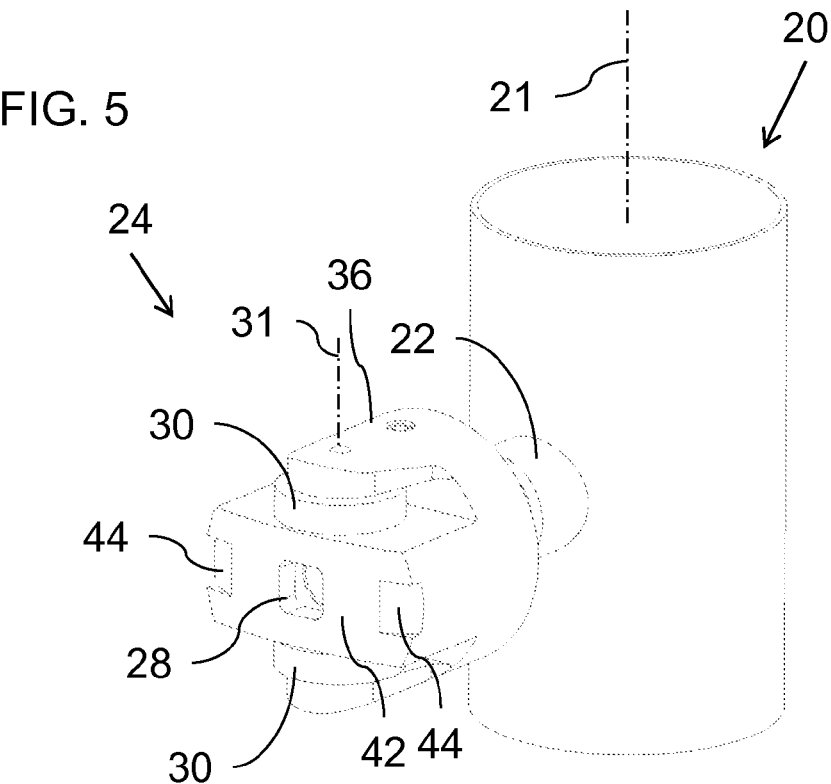
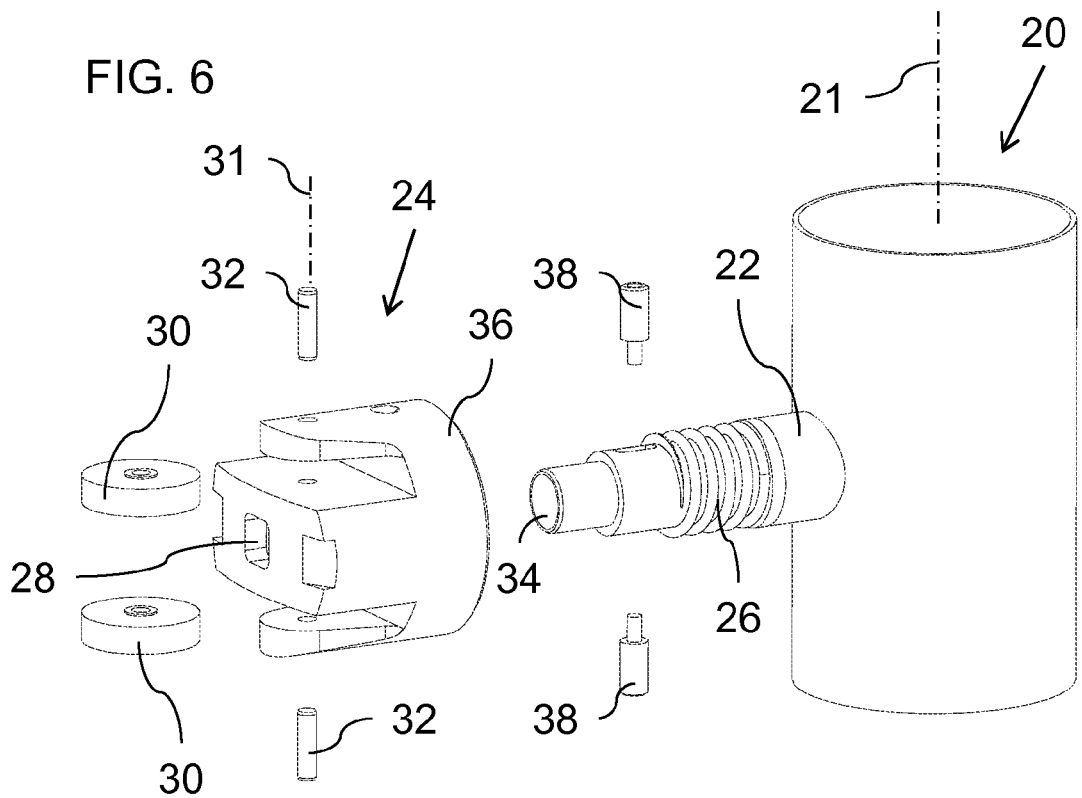

BACKWASH ARRANGEMENT FOR CLEANING A CYLINDRICAL FILTER SCREEN

FIELD AND BACKGROUND OF THE INVENTION

The present invention relates to filtering systems and, in particular, it concerns a backwash arrangement for cleaning a cylindrical filter screen.

Large throughput filtration systems are used for treating liquids (for example, water or sea water) in a wide range of applications. The present invention relates particularly to filtering systems in which liquids are passed through one or more cylindrical filter screen, and in which the inner surface of the filter screen is cleaned of accumulated debris by a backwash arrangement that generates low pressure in a suction nozzle passing over the inside of the filter screen. Debris accumulated on the internal surface of the filter screen during filtration is lifted out of the filter screen by a flow of the filtered liquid in a reverse direction ("backwash") through the screen into the nozzle, from where it is expelled from the system. Examples of such systems are described in the following patent documents: DE 19944107, GB 1485989, US 2008/0047885 and WO 2011/058556.

For an optimal cleaning process, liquid would be drawn through the screen without leakage of unfiltered liquid from around the nozzle into the suction arrangement. Liquid sucked from the surroundings of the nozzle instead of through the filter screen reduces efficacy of the self-cleaning process, and results in significant wastage of energy and of liquid. The main factor that determines the ratio between filtered liquid backwashed through the filter and liquid leaking from around the nozzle is the proximity of the suction nozzle to the filter screen. It is therefore desirable to bring the suction nozzle as close as possible to the screen. The filter screens however are fine, and have significant variations (tolerances) from an exact cylindrical shape, making it difficult to reduce a clearance between the backwash nozzles and the screen.

In an attempt to achieve close proximity of the nozzles to the screen, some of the above references suggest the use of spring-loaded nozzles that press against the screen. This however increases friction and wear of the components, thereby reducing the lifetime of the system.

There is therefore a need for a backwash arrangement for cleaning a cylindrical filter screen which would achieve close positioning of the backwash nozzles to the screen without generating greatly increased wear and friction moment.

SUMMARY OF THE INVENTION

The present invention is a backwash arrangement for cleaning a cylindrical filter screen.

According to the teachings of the present invention there is provided, a backwash arrangement for cleaning a cylindrical filter screen, the backwash arrangement comprising: (a) a cylindrical filter screen; (b) a central conduit extending axially within the cylindrical filter screen; (c) a plurality of radial branch conduits extending outwards from the central conduit towards the cylindrical filter screen; and (d) a spring-loaded nozzle arrangement associated with each of the radial branch conduits, the spring-loaded nozzle arrangement being biased into contact with the cylindrical filter screen, wherein the spring-loaded nozzle arrangement comprises: (i) a nozzle opening for passing across the cylindrical filter screen, and (ii) a pair of wheels deployed on opposing sides of the nozzle opening and deployed for rolling engagement with the cylindrical filter screen.

According to another preferred feature of an embodiment of the invention, each of the pair of wheels has a separate axle that does not pass through a flow path from the nozzle opening along the radial branch conduit to the central conduit.

According to another preferred feature of an embodiment of the invention, the pair of wheels are mounted on axes of rotation parallel to an axis of the central conduit.

According to another preferred feature of an embodiment of the invention, there is also provided a helical motion linkage associated with the central conduit and defining a path of helical motion around and along an axis of the central conduit, and wherein the pair of wheels are mounted on axes of rotation oriented to align the wheels with a helical path across the cylindrical filter screen.

According to another preferred feature of an embodiment of the invention, the nozzle opening has a rectangular form.

According to another preferred feature of an embodiment of the invention, the rectangular form has rounded corners.

According to another preferred feature of an embodiment of the invention, the rectangular form has a length-to-width ratio less than 10.

According to another preferred feature of an embodiment of the invention, the nozzle opening is defined by a nozzle block, the nozzle block further comprising a ramp surface deployed so as to tend to raise the spring-loaded nozzle arrangement over particles encountered on the cylindrical filter screen, thereby allowing the particles to enter the nozzle opening.

According to another preferred feature of an embodiment of the invention, the ramp surface has a dimension perpendicular to a direction of motion across the cylindrical filter screen, the dimension being substantially equal to a corresponding dimension of the nozzle opening perpendicular to the direction of motion across the cylindrical filter screen.

BRIEF DESCRIPTION OF THE DRAWINGS

The invention is herein described, by way of example only, with reference to the accompanying drawings, wherein:

FIG. 5 is an enlarged isometric view of a single spring-loaded nozzle arrangement from the backwash arrangement of FIG. 4;

FIG. 6 is an exploded isometric view of the spring-loaded nozzle arrangement of FIG. 5;

DESCRIPTION OF THE PREFERRED EMBODIMENTS

The present invention is a backwash arrangement for cleaning a cylindrical filter screen.

The principles and operation of backwash arrangements according to the present invention may be better understood with reference to the drawings and the accompanying description.

Figure 1:
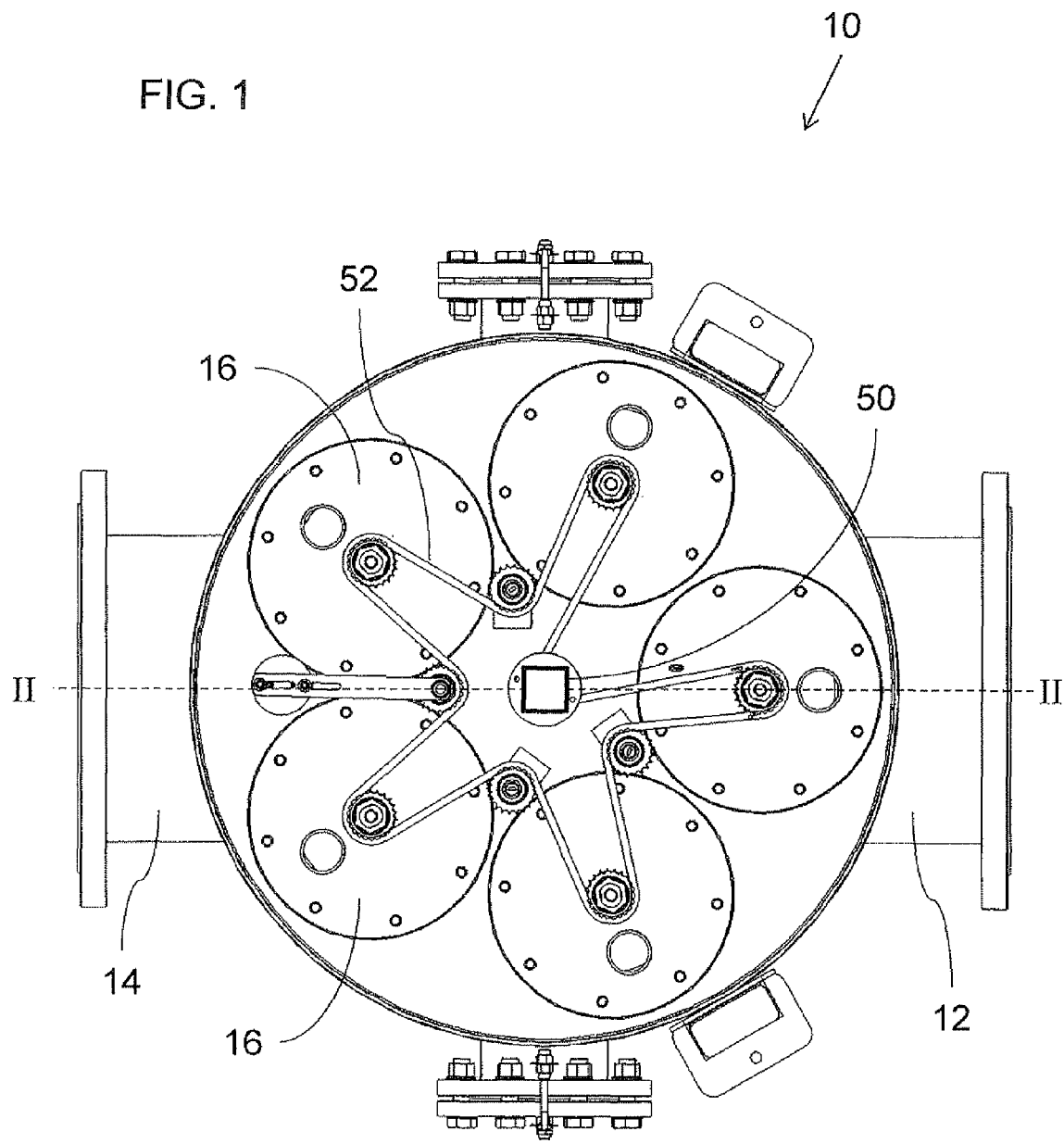
FIG. 1 is a schematic plan view of a filtering system including a backwash arrangement for cleaning a cylindrical filter screen, constructed and operative according to the teachings of an embodiment of the present invention.
Figure 2:
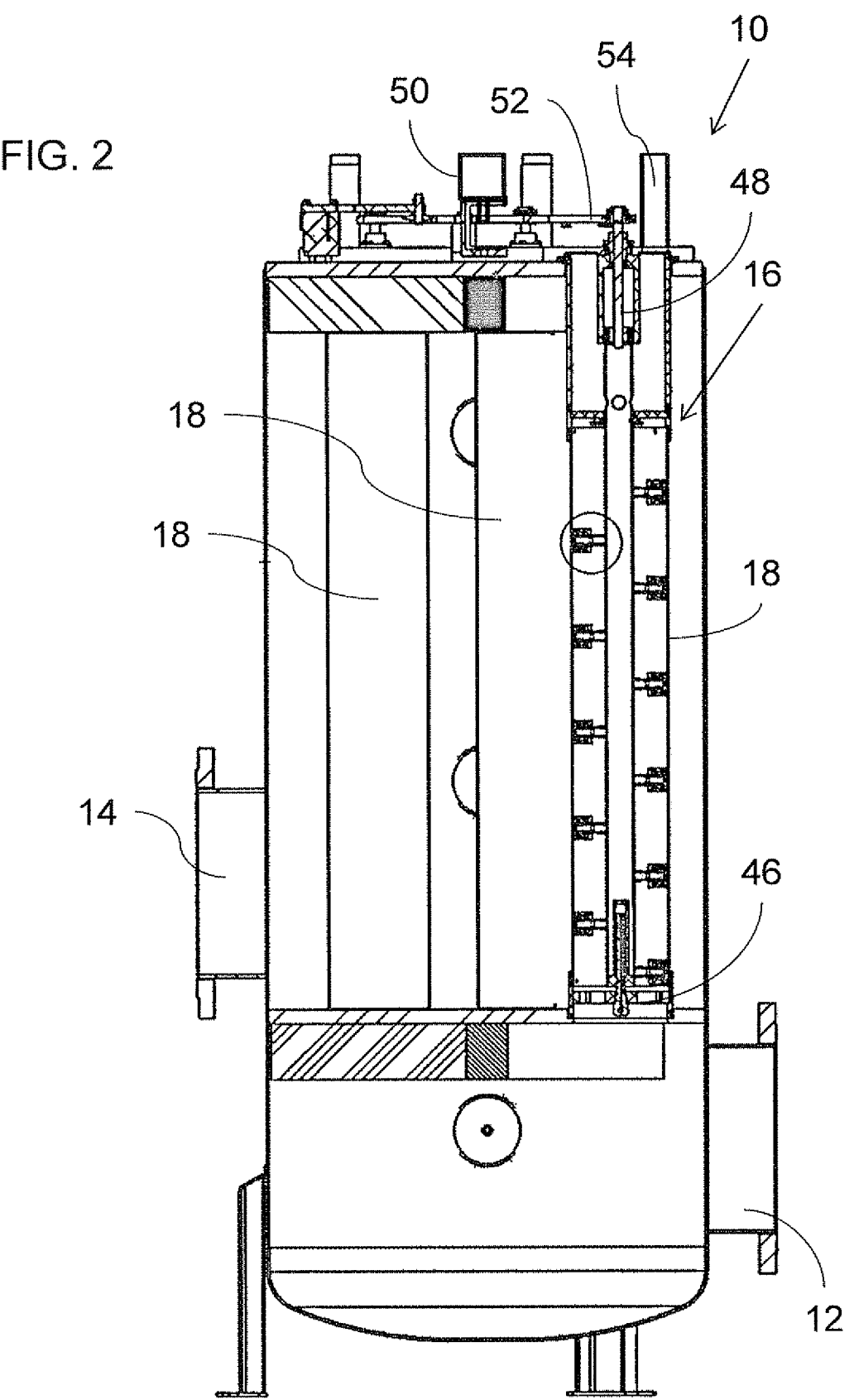
FIG. 2 is a vertical cross-sectional view taken along the line II-II in FIG. 1.

Referring now to the drawings, FIGS. 1 and 2 illustrate a non-limiting exemplary filter arrangement, generally designated 10, in which context the present invention will be illustrated. Filter arrangement 10 has an inlet 12, an outlet 14 and one or more filter assemblies 16, each including a cylindrical filter screen 18. In the example illustrated here, a set of 5 filter assemblies are used in parallel, but the invention is equally applicable to filter arrangements having a single filter screen assembly, or any other number of such assemblies.

Operation of filter arrangement 10 is as follows. Water (or another liquid to be filtered) enters inlet 12 and passes up the inside of the filter assemblies 16 where it flows radially outwards through the cylindrical filter screens 18, thereby undergoing filtering, before passing to outlet 14.

Figure 3:
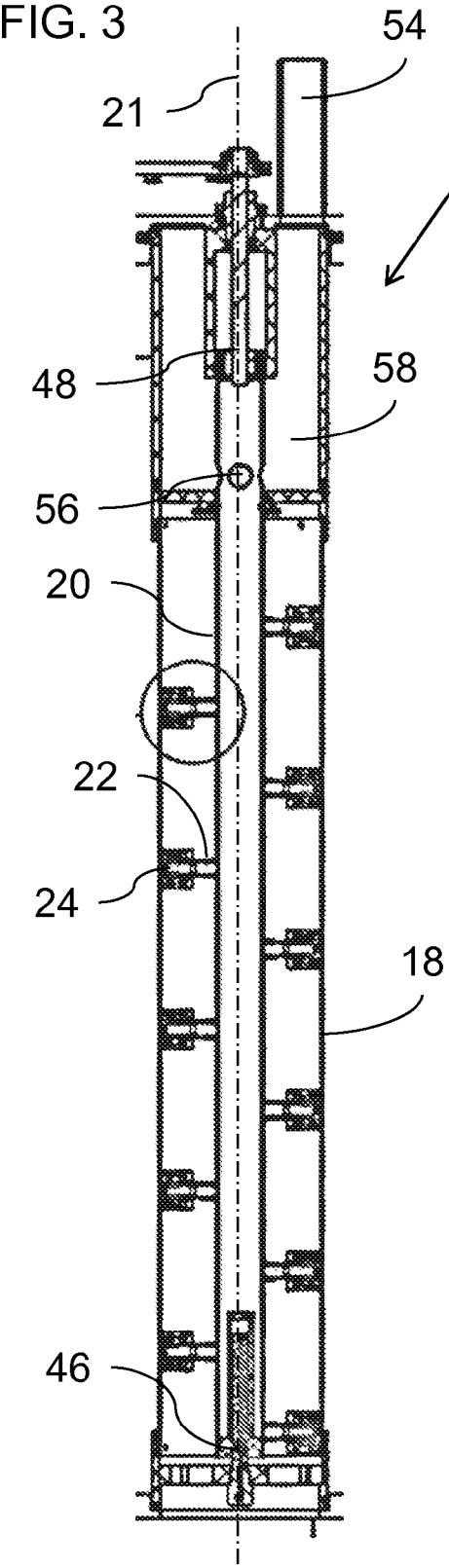
FIG. 3 is an enlarged cross-sectional view of a cylindrical filter and corresponding backwash arrangement from FIG. 2.
Figure 4:
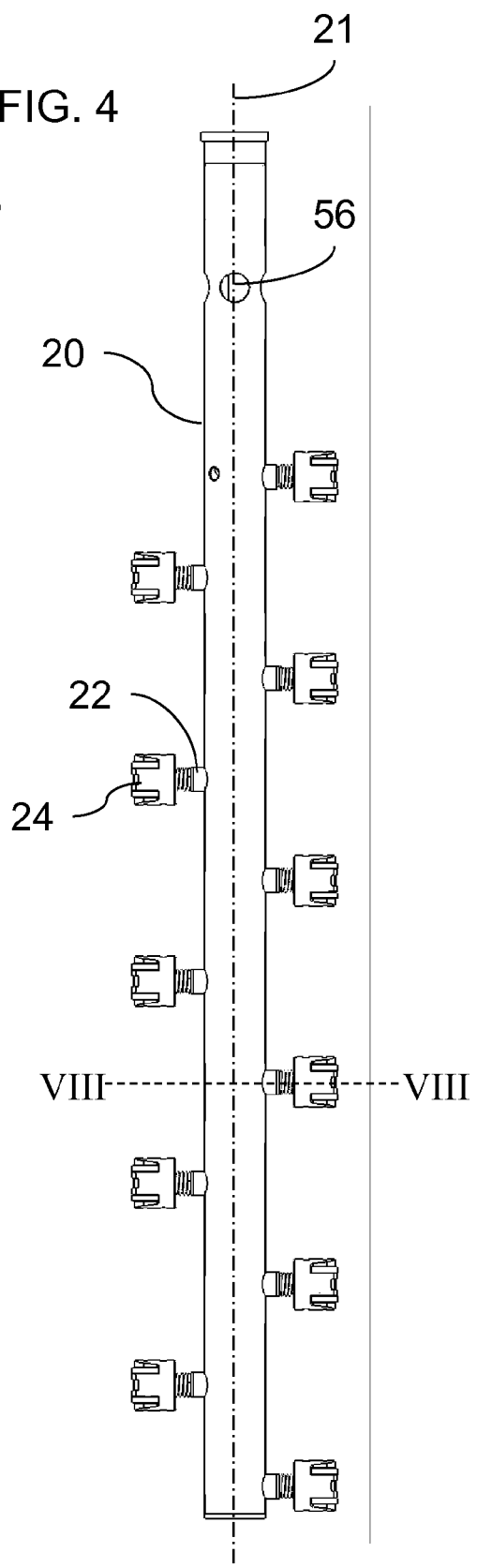
FIG. 4 is an enlarged side view of the backwash arrangement from FIG. 3.

Each filter assembly 16 features a backwash arrangement for cleaning cylindrical filter screen 18, shown in enlarged views in FIGS. 3 and 4. The backwash arrangement generally includes a central conduit 20, extending coaxially within cylindrical filter screen 18 so as to share a common central axis 21 with filter screen 18, from which a plurality of radial branch conduits 22 extend outwards. Associate with each radial branch conduit 22 is a spring-loaded nozzle arrangement 24.

The construction of spring-loaded nozzle arrangement 24 is best seen in FIGS. 5-8. Each spring-loaded nozzle arrangement 24 is biased into contact with cylindrical filter screen 18 by a spring 26. Nozzle arrangement 24 defines a nozzle opening 28 for passing across the cylindrical filter screen, and a pair of wheels 30 disposed on opposing sides of nozzle opening 28 and deployed for rolling engagement with cylindrical filter screen 18.

At this stage it will already be appreciated that the present invention provides distinct advantages over existing backwash arrangements. Specifically, the provision of wheels 30 together with the biasing of spring 26 ensure intimate proximity, typically to within a fraction of a millimeter, between nozzle opening 18 and the surface of cylindrical filter screen 18, despite significant variations in the radial spacing of the filter screen from the central conduit, thereby making the backwash process as efficient as possible. At the same time, wheels 30 ensure that frictional wear of the nozzle arrangements 24 and of the filter screen 18 is kept to a minimum, thereby extending the lifespan of the product and reducing the frictional moment opposing operation of the motor. The positioning of the wheels bilaterally, outside the flow path 34 from nozzle opening 28 along radial branch conduit 22 to central conduit 20, helps to avoid obstruction to the flow path. Most preferably, the point of highest flow impedance in that flow path 34 is at the nozzle opening 28, thereby ensuring that the maximum pressure drop occurs where it is needed for effective removal of debris from the filter screen.

Figure 7:
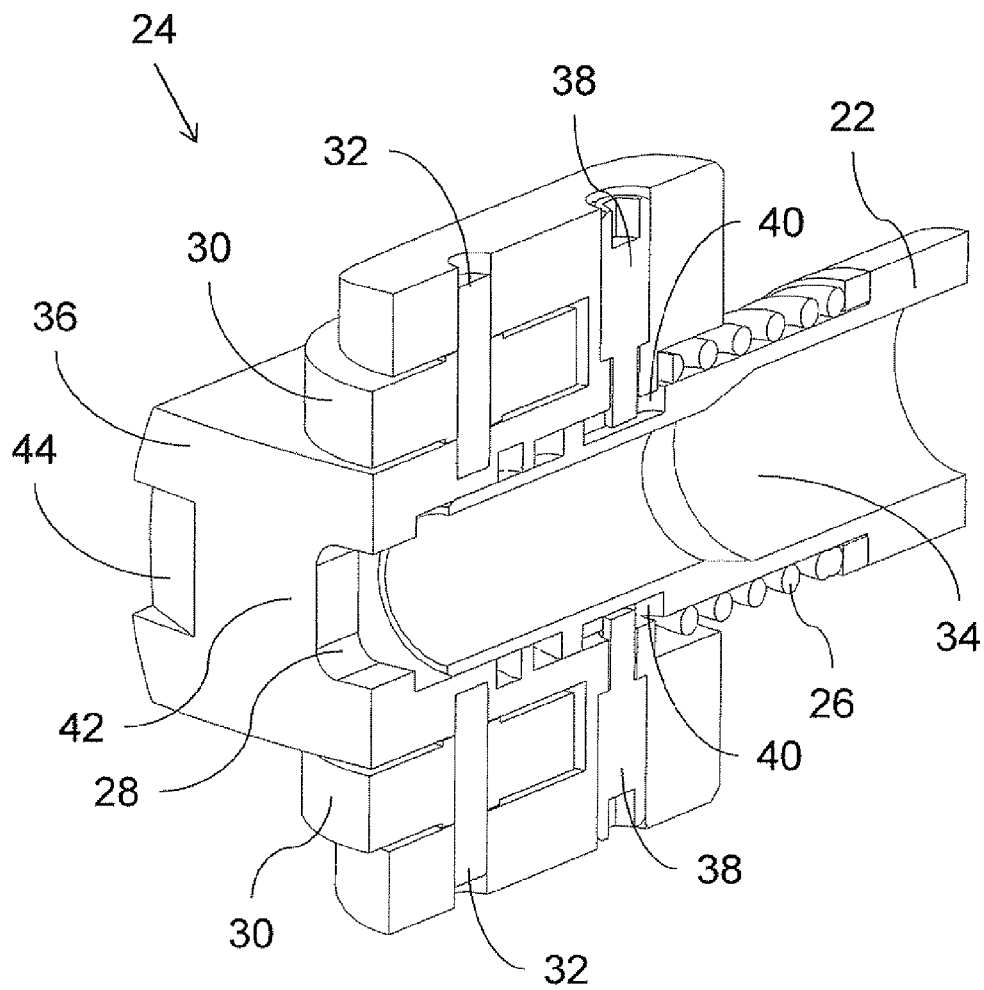
FIG. 7 is a cut-away view of the spring-loaded nozzle arrangement of FIG. 5.

As best seen in FIGS. 6 and 7, each wheel 30 preferably has a separate axle 32 that does not pass through flow path 34. The use of separate axles for each wheel allows an implementation as shown in which there is substantially no flow impediment within flow path 34.

Most preferably, nozzle opening 28 is an opening formed in a nozzle block 36, which is configured for sliding telescopic motion in sealing relation which radial brand conduit 22, and which is implemented as a unitary block receiving wheel axles 32. Nozzle block 36 may be conveniently secured to radial branch conduit 22 by one or more locking pins 38 which engage corresponding slots 40 formed in radial branch conduit 22, thereby locking nozzle arrangement 24 against rotation while allowing radial displacement against the bias of spring 26 as the nozzle arrangement accommodates undulations and variations in the filter screen.

Figure 8:
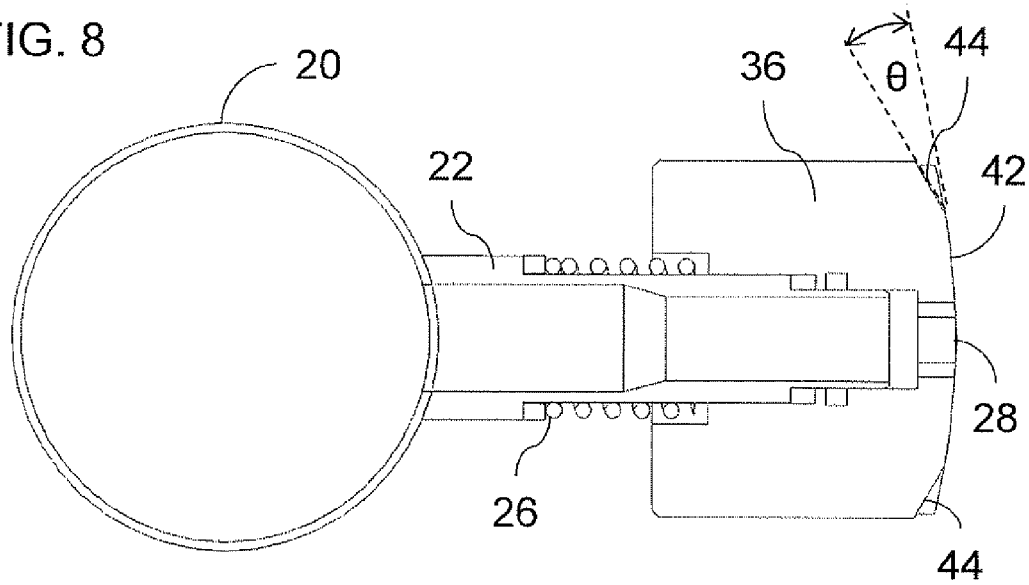
FIG. 8 is a cross-sectional view taken along line VIII-VIII of FIG. 4.

Nozzle block 36 preferably provides a peripheral surface 42 around nozzle opening 28 which is preferably shaped to conform to the internal surface of the filter screen, thereby ensuring a significant surface in close facing relation to the screen during use, thereby providing enhanced flow impedance against leakage of water around the nozzle from inside the screen. The arcuate curvature of peripheral surface 42 conforming to the inner surface of the cylindrical filter screen is best seen in FIG. 8. The dimensions of peripheral surface 42 are preferably sufficient to provide a margin around nozzle opening which is preferably at least half of the corresponding dimension of the nozzle opening. The dimension of this margin in the axial direction is typically smaller than in the peripheral direction so as not to obstruct the nozzle from reaching the ends of the cylindrical screen. Beyond peripheral surface 42 in the direction of travel of nozzle opening 28 across the screen, nozzle block 36 is preferably also provided with a ramp surface 44 deployed so as to tend to momentarily retract spring-loaded nozzle arrangement 24 so that it rides up and over any larger particles encountered on the cylindrical filter screen, so that the particles can enter the nozzle opening. The angle of the ramp surfaces is chosen to be sufficiently shallow to allow the nozzle to retract against its spring loading so as to ride over the particles. An angle $\theta$ of between about 15° and about 35° to the local circumference of the cylinder is typically suitable. A dimension of ramp surface 44 perpendicular to the direction of motion across the cylindrical filter screen is preferably matched (substantially equal) to a corresponding dimension of nozzle opening 28 perpendicular to the direction of motion across the cylindrical filter screen. Particles that are not aligned with the nozzle are typically pushed aside by the leading edges on either side of the ramp, and are likely to be sucked up and expelled on a subsequent pass of the nozzle. Ramp surfaces 44 are preferably provided symmetrically, both ahead and behind nozzle opening 28 in the direction of motion, since the backwash arrangement is typically operated bidirectionally.

It should be noted that the nozzle may be designed to be "balanced", i.e., that forces resulting from a pressure difference between the outside and the inside of the nozzle do not result in a net radial force on the assembly towards the central conduit. Alternatively, in an unbalanced design, slight excess spring bias may be provided to ensure that contact is maintained between the nozzle assembly and the filter screen under the expected range of working conditions.

As mentioned above, preferred embodiments of the present invention achieve close positioning of nozzle opening 28 and its peripheral surface 42 against the inside surface of the cylindrical filter screen 18 while minimizing friction through the rolling contact of wheels 30. For this purpose, wheels 30 are preferably set so that their outer edges are level with the corresponding region of peripheral surface 42 to a precision of less than 1 mm difference, and most preferably to within a tolerance of about 0.2 mm. It should be noted however that precision of initial alignment is typically not critical. If peripheral surface 42 is initially slightly higher than wheels 30, since slight abrasion of the contact surface during use will typically lead to leveling of peripheral surface 42 with wheels 30 during an initial wearing-in process. Alternatively, in certain implementations, it may be preferably to have wheels 30 projecting slightly (typically less than a millimeter, and preferably less than half a millimeter) from peripheral surface 42 so that substantially all of the contact pressure of nozzle assembly 24 is borne by wheels 30 and frictional wear is minimized.

According to certain preferred embodiments of the present invention, nozzle opening 28 has a generally rectangular form, most preferably with rounded corners. The use of a rectangular form achieves a more uniform cleaning effect than a round suction nozzle since the amount of time each part of the filter is exposed to suction is close to uniform across the width swept by the nozzle opening. For efficiency of suction through the filter screen, it is preferable to employ a nozzle opening with a relatively small ratio of periphery to area. To this end, the rectangular form of nozzle opening 28 preferably has a length-to-width ratio less than 10, and most preferably less than 5.

Referring now back to FIG. 3, this illustrates an exemplary deployment of the backwash arrangement within a filter assembly 16. A helical motion linkage 46 is associated with central conduit 20 and defines a path of helical motion around and along an axis of central conduit 20. Helical motion linkage 46 is typically implemented using a nut mounted near an end of central conduit 20 engaged on a fixed axial bolt, so that rotation of the central conduit results in axial displacement by the pitch of the thread for each revolution. The helical path preferably has a pitch (helical step) per revolution sufficiently small that successive sweeps of each nozzle opening 28 around the internal surface of the filter screen 18 cover adjacent or slightly overlapping strips, thereby providing continuous coverage of the filter screen surface. At the other end of central conduit 20 in the example illustrated here is a rotary motion drive linkage 48 which transfers rotation directly or indirectly from one or more actuator motor. In the example illustrated here (FIG. 1), all of the backwash mechanisms are driven to turn simultaneously by a common drive motor 50 via a drive chain 52. Where a common drive motor is used to drive the mechanisms simultaneously, it may in some cases be desired to include a torque limiter clutch to ensure that each backwash mechanism stops exactly at the end of its range of motion. Actuation of drive motor 50 in one direction causes rotation of all central conduits 20, each about its central axis, so that the nozzle arrangements 24 each move around the inner surface of the filter screen 18 with a small helical angle, effectively performing a scanning motion moving up the cylinder until each nozzle assembly reaches the starting location of the nozzle assembly above, thereby covering substantially the entire inner surface of the filter screen. The assembly typically remains in the end position until the next cleaning cycle is required, when the motor direction is actuated in the reverse direction so that the nozzles undergo a similar motion in reverse, returning to their original positions.

Actuation of the backwash flow may be achieved by selective opening of a control valve (not shown) associate with a backwash outlet 54 (FIGS. 1-3). When the backwash outlet 54 is opened, water is forced by the pressure within the filter system backwards through the nozzle assemblies 24 and radial branch conduits 22, and along central conduit 20 to a number of venting apertures 56 which open into a backwash chamber 58 prior to release through backwash outlet 54. Optionally, in order to avoid undue loss of working pressure and maximize the pressure drop across each filter screen for effective backwash, the control valves may be opened one at a time so that only a single backwash assembly is active at any given time, even where multiple assemblies are turned simultaneously. In other applications, all of the assemblies may be operated simultaneously. In an alternative implementation, each backwash assembly can be provided with a separate drive motor which is selectively actuated only when that backwash assembly is operative.

In order to minimize frictional wear on wheels 30, according to certain preferred implementations of the present invention, nozzle block 36 and axles 32 are configured so that the axes 31 of rotation of wheels 30 have a slight angular offset relative to axis 21 of central conduit 20, corresponding to the angular pitch of the helical motion, so that they are oriented to align the wheels with the helical path of motion across cylindrical filter screen 18. Alternatively, since in most cases the pitch angle is very small, in certain embodiments, pair of wheels 30 are mounted on axes of rotation 31 that are parallel to the axis 21 of central conduit 20.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. A backwash arrangement for cleaning a cylindrical filter screen, the backwash arrangement comprising:
   (a) a cylindrical filter screen;
   (b) a central conduit extending axially within said cylindrical filter screen;
   (c) a plurality of radial branch conduits extending outwards from said central conduit towards said cylindrical filter screen; and
   (d) a spring-loaded nozzle arrangement associated with each of said radial branch conduits, said spring-loaded nozzle arrangement being biased into contact with said cylindrical filter screen, wherein said spring-loaded nozzle arrangement comprises:
      (i) a nozzle opening for passing across said cylindrical filter screen, and
      (ii) a pair of wheels deployed on opposing sides of said nozzle opening and deployed in rolling engagement with said cylindrical filter screen,
      wherein said nozzle opening and outer edges of said wheels are at the same level to a precision of less than 1 millimeter difference.

2. The backwash arrangement of claim 1, wherein each of said wheels has a separate axle that does not pass through a flow path from said nozzle opening along said radial branch conduit to said central conduit.

3. The backwash arrangement of claim 1, wherein said pair of wheels are mounted on axes of rotation parallel to an axis of said central conduit.

4. The backwash arrangement of claim 1, further comprising a helical motion linkage associated with said central conduit and defining a path of helical motion around and along an axis of said central conduit, and wherein said pair of wheels are mounted on axes of rotation oriented to align said wheels with a helical path across said cylindrical filter screen.

5. The backwash arrangement of claim 1, wherein said nozzle opening has a rectangular form.

6. The backwash arrangement of claim 5, wherein said rectangular form has rounded corners.

7. The backwash arrangement of claim 5, wherein said rectangular form has a length-to-width ratio less than 10.

8. The backwash arrangement of claim 1, wherein said nozzle opening is defined by a nozzle block, said nozzle block further comprising a ramp surface deployed so as to tend to raise said spring-loaded nozzle arrangement over particles encountered on said cylindrical filter screen, thereby allowing the particles to enter said nozzle opening.

9. The backwash arrangement of claim 8, wherein said ramp surface has a dimension perpendicular to a direction of motion across said cylindrical filter screen, said dimension matching a corresponding dimension of said nozzle opening perpendicular to the direction of motion across said cylindrical filter screen.

* * * * *